(12) United States Patent
Choi et al.

(10) Patent No.: US 9,755,216 B2
(45) Date of Patent: Sep. 5, 2017

(54) SECONDARY BATTERY AND SECONDARY BATTERY MODULE INCLUDING THE SAME

(71) Applicant: SAMSUNG SDI CO., LTD., Yongin-si, Gyeonggi-do (KR)

(72) Inventors: Hong-Keun Choi, Yongin-si (KR); Min-Cheol Bae, Yongin-si (KR); Ik-Jae Jeong, Yongin-si (KR); Kyoung-Hwan Noh, Yongin-si (KR); Ji-Ho Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 76 days.

(21) Appl. No.: 14/820,066

(22) Filed: Aug. 6, 2015

(65) Prior Publication Data

US 2016/0043376 A1 Feb. 11, 2016

(30) Foreign Application Priority Data

Aug. 8, 2014 (KR) .......................... 10-2014-0102377

(51) Int. Cl.
*H01M 2/06* (2006.01)
*H01M 2/30* (2006.01)
(Continued)

(52) U.S. Cl.
CPC .............. *H01M 2/30* (2013.01); *H01M 2/06* (2013.01); *H01M 2/202* (2013.01); *H01M 2/263* (2013.01);
(Continued)

(58) Field of Classification Search
CPC ........ H01M 2/30; H01M 2/263; H01M 2/202; H01M 2/06; H01M 2/0439; H01M 2/0285; H01M 2/0426; H01M 2/0217
See application file for complete search history.

(56) References Cited

U.S. PATENT DOCUMENTS

2011/0244309 A1  10/2011  Byun et al.
2012/0021278 A1*  1/2012  Byun .................. H01M 2/0473
                                                             429/179

(Continued)

FOREIGN PATENT DOCUMENTS

KR  10-2011-0029869 A  3/2011
KR  10-2011-0109843 A  10/2011
(Continued)

*Primary Examiner* — Cynthia K Walls
(74) *Attorney, Agent, or Firm* — Lewis Roca Rothgerber Christie LLP (57) ABSTRACT

A secondary battery includes an electrode assembly, a battery case, and a cap assembly. The electrode assembly may include a first electrode plate, a second electrode plate, and a separator. The battery case may accommodate the electrode assembly, which may be inserted into the battery case through an opening provided on one side of the battery case. The cap assembly may include a cap plate coupled to the side of the battery case including the opening and sealing up the battery case, and first and second terminals spaced on the cap plate. The first and second terminals may each include first and second terminal plates including protrusions that protrude away from the electrode assembly, and first and second terminal connection members on the first and second terminal plates and including grooves that can be combined with the corresponding protrusions.

15 Claims, 4 Drawing Sheets

(51) Int. Cl.
*H01M 2/20* (2006.01)
*H01M 2/26* (2006.01)
H01M 2/02 (2006.01)
H01M 2/04 (2006.01)

(52) U.S. Cl.
CPC ........ *H01M 2/0217* (2013.01); *H01M 2/0285* (2013.01); *H01M 2/0426* (2013.01); *H01M 2/0439* (2013.01)

(56) References Cited

U.S. PATENT DOCUMENTS

| | | |
|---|---|---|
| 2012/0100420 A1 | 4/2012 | Byun et al. |
| 2012/0177978 A1* | 7/2012 | Kim ........................ H01M 2/30 429/159 |
| 2012/0214053 A1 | 8/2012 | Kim |

FOREIGN PATENT DOCUMENTS

| | | |
|---|---|---|
| KR | 10-2012-0041877 A | 5/2012 |
| KR | 10-2012-0095290 A | 8/2012 |

\* cited by examiner

SECONDARY BATTERY AND SECONDARY BATTERY MODULE INCLUDING THE SAME

CROSS-REFERENCE TO RELATED APPLICATION

This application claims priority to and the benefit of Korean Patent Application No. 10-2014-0102377, filed on Aug. 8, 2014, in the Korean Intellectual Property Office, the entire content of which is incorporated herein by reference.

BACKGROUND

1. Field

One or more embodiments of the present invention relates to a secondary battery and a secondary battery module including the same.

2. Description of the Related Art

A secondary battery, unlike a primary battery, is rechargeable. As such, secondary batteries are often used as a power source for small electronic apparatuses such as, for example, mobile devices. In addition, secondary battery can also be used as a power source for driving a motor of a hybrid vehicle.

A typical secondary battery includes an electrode assembly, a battery case for accommodating the electrode assembly, and a cap assembly for covering an opening of the battery case. The electrode assembly is electrically coupled to an external power source device through a positive electrode terminal and a negative electrode terminal of the cap assembly.

The positive electrode terminal and the negative electrode terminal can also be electrically coupled to a negative electrode terminal and a positive electrode terminal of another secondary battery through a bus bar.

The terminals and the bus bar are usually coupled through welding. However, a material of the terminals and that of the bus bar are often different metal materials. The quality of welding of dissimilar metals is lower than the quality of welding of similar metals. As a result, welding bond strength between the terminals and the bus bar is lower than it would have been if the terminals and the bus bar were formed of the same material.

SUMMARY

One or more embodiments of the present invention relate to a secondary battery with improved quality of welding of dissimilar metals.

One or more embodiments of the present invention also relate to a secondary battery module including the secondary battery.

A secondary battery according to one embodiment of the present invention includes an electrode assembly, a battery case, and a cap assembly. The electrode assembly may include a first electrode plate, a second electrode plate, and a separator. The battery case may accommodate the electrode assembly. The cap assembly may include a cap plate coupled to the battery case and sealing the battery case, and first and second terminals spaced from each other on the cap plate. The first and second terminals may include first and second terminal plates each including a protrusion that protrudes away from the electrode assembly, and first and second terminal connection members respectively on the first and second terminal plates, each including a groove coupled with the corresponding protrusion.

An external surface of the protrusion and an internal surface of the groove may each include a screw thread, and the screw thread of the groove may correspond to the screw thread of the protrusion.

The first and second terminal plates may each include a locking groove on the surfaces of the first and second terminal plates respectively facing the first and second terminal connection members, and the first and second terminal connection members may each include a locking protrusion on the surfaces of the first and second terminal connection members respectively facing the first and second terminal plates, and the locking protrusions of the first and second terminal connection members may be in the locking grooves of the first and second terminal plates, respectively.

The first and second terminal connection members may each include a concave portion extending in one direction and arranged on the surfaces of the first and second terminal connection members respectively opposite the first and second terminal plates.

The first and second terminal connection members may each include a protruding portion on the surfaces of the first and second terminal connection members respectively opposite the first and second terminal plates and protruding away from the cap plate.

The secondary battery may further include first and second collecting plates accommodated in the battery case and electrically coupled to the first and second electrode plates and the first and second terminal plates, respectively.

The secondary battery may further include first and second gaskets between the cap plate and the first and second terminal plates, respectively.

A secondary battery module according to an embodiment of the present invention includes a plurality of secondary batteries, each of the plurality of secondary batteries including an electrode assembly, a battery case accommodating the electrode assembly, and a cap assembly, and a plurality of bus bars electrically coupled to the plurality of secondary batteries. The cap assembly may include a cap plate coupled to the battery case and sealing the battery case, and first and second terminals spaced from each other on the cap plate. The first and second terminals may include first and second terminal plates each including a protrusion that protrudes away from the electrode assembly, and first and second terminal connection members each including a groove coupled with the corresponding protrusion, wherein the first and second terminal connection members electrically couple the first and second terminal plates and the bus bars, respectively.

The terminal connection member may be formed of the same material as the bus bar. Therefore, it may be possible to improve bond strength between the bus bar and the terminal connection member, and prevent or reduce deterioration of the bond strength in the secondary battery module in which the secondary batteries are electrically coupled by the bus bars.

BRIEF DESCRIPTION OF THE DRAWINGS

The accompanying drawings, together with the specification, illustrate embodiments of the present disclosure, and, together with the description, serve to explain the principles of the present disclosure.

In the drawings, dimensions may be exaggerated for clarity of illustration.

DETAILED DESCRIPTION

Exemplary embodiments will now be described more fully hereinafter with reference to the accompanying drawings. However, as those skilled in the art would recognize, the present disclosure may be embodied in different forms and should not be construed as limited to the embodiments set forth herein. Rather, these embodiments are provided so that this disclosure will be thorough and complete, and will fully convey the scope of the exemplary embodiments to those skilled in the art.

Like reference numerals refer to like elements throughout. In the drawings, dimensions may be exaggerated for clarity of illustration. It will be understood that, although the terms "first", "second", etc., may be used herein to describe various elements, these elements should not be limited by these terms. These terms are only used to distinguish one element from another element. For example, a first element may be named a second element and, similarly, a second element may be named a first element, without departing from the scope of the present invention.

Unless otherwise defined, terms "include" and "have" are for representing characteristics, numbers, steps, operations, elements, and portions described in the specification or a combination thereof. It may be interpreted that one or more other characteristics, numbers, steps, operations, elements, and portions or a combination thereof may be added. It will also be understood that when an element is referred to as being "on" another element, it can be directly on the other element, or intervening elements may also be present. On the other hand, when an element is referred to as being "immediately on" or as "directly contacting" another element, it can be understood that intervening elements do not exist. Other expressions describing a relationship between elements, for example, "between" and "directly between", may be interpreted like the above. Expressions such as "at least one of" and "one of," when preceding a list of elements, modify the entire list of elements and do not modify the individual elements of the list. Further, the use of "may" when describing embodiments of the present invention refers to "one or more embodiments of the present invention."

Hereinafter, embodiments of the present invention will be described in detail with reference to the accompanying drawings.

Figure 1:
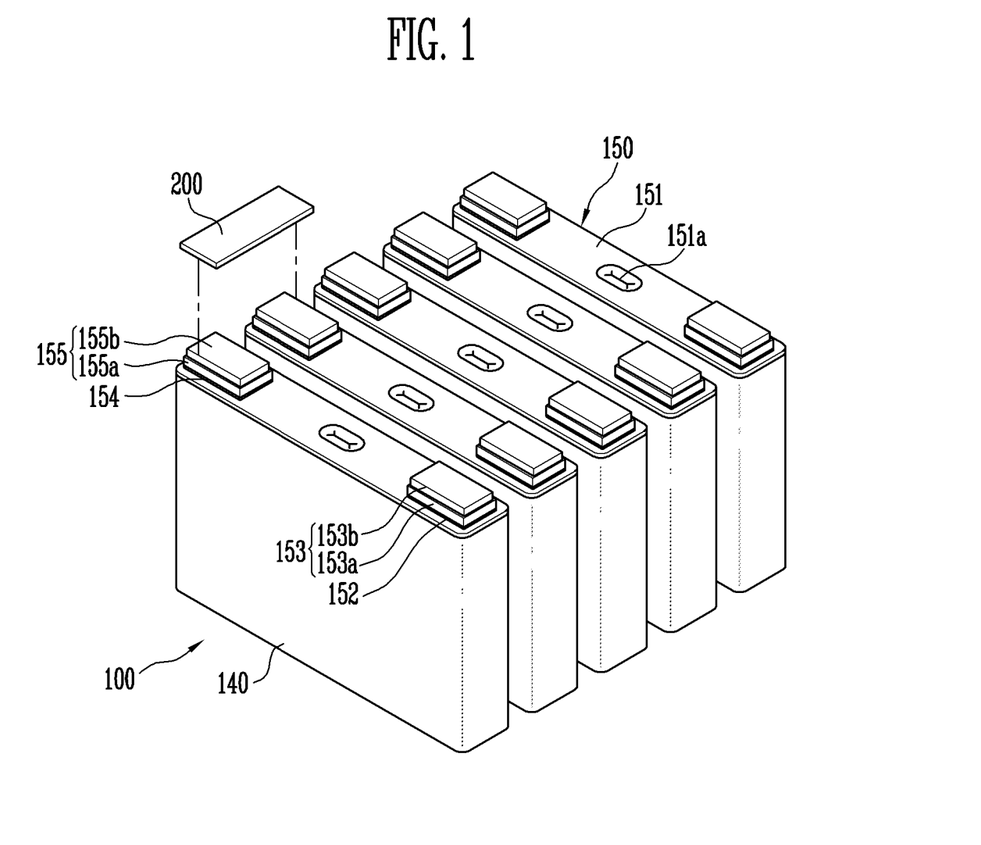
FIG. 1 is a schematic perspective view illustrating a secondary battery module according to an embodiment of the present invention.
Figure 2:
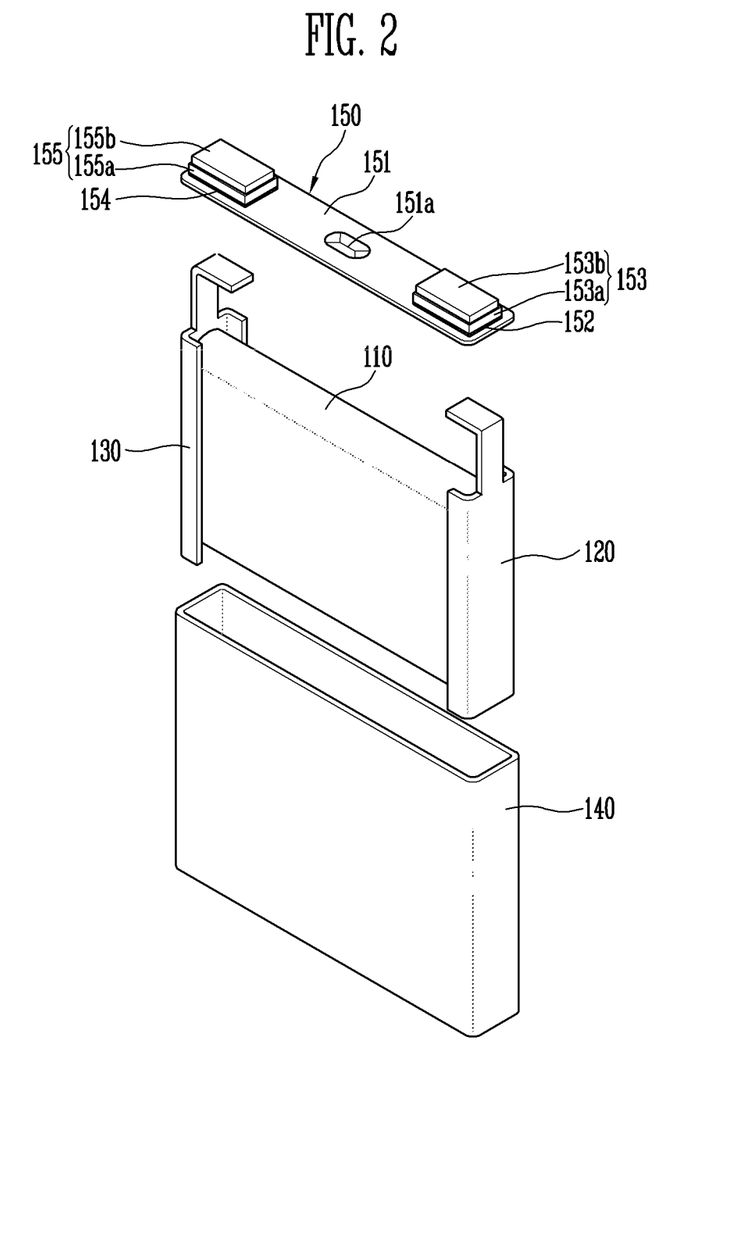
FIG. 2 is an exploded schematic perspective view illustrating the secondary battery of FIG. 1.
Figure 3:
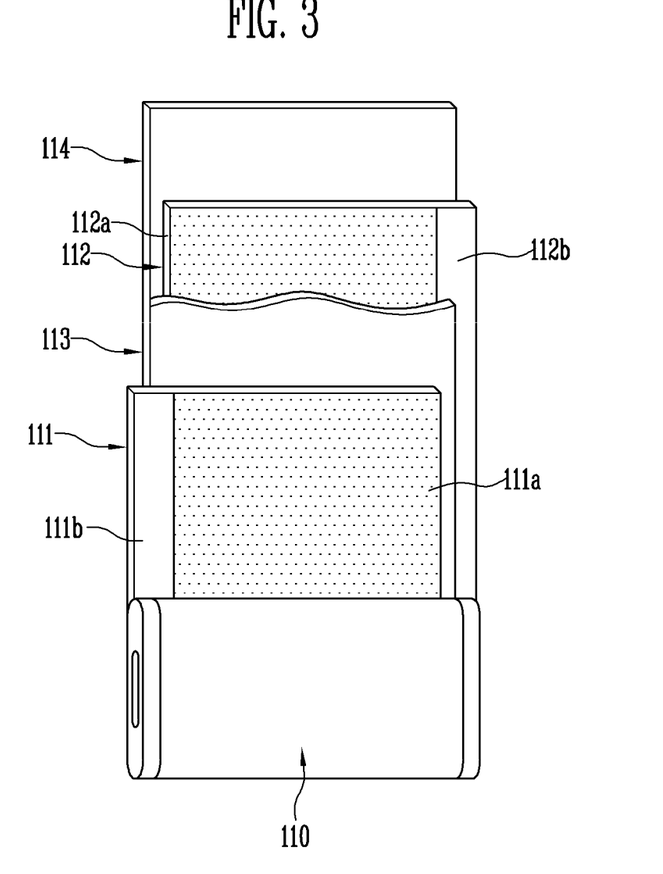
FIG. 3 is a schematic perspective view illustrating the electrode assembly of FIG. 2.
Figure 4:
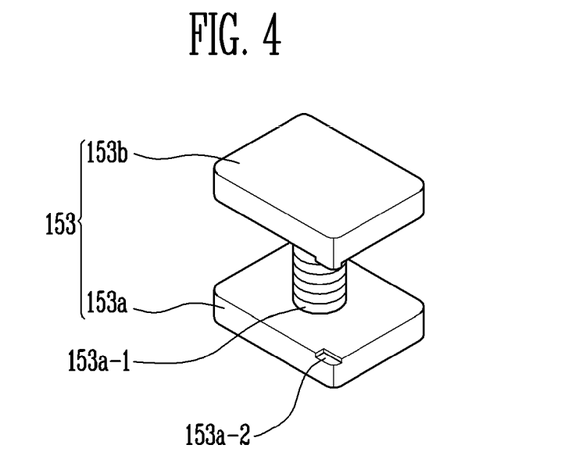
FIG. 4 is a schematic perspective view illustrating the terminal plate and the terminal connection member of FIG. 2.
Figure 5:
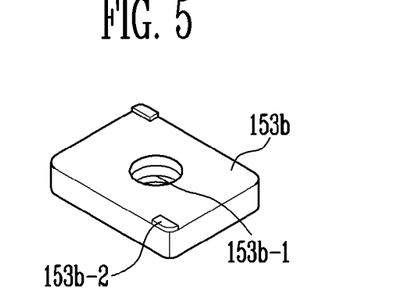
FIG. 5 is a bottom schematic perspective view illustrating the terminal connection member of FIG. 4.

FIG. 1 is a schematic perspective view illustrating a secondary battery module according to an embodiment of the present invention. FIG. 2 is an exploded schematic perspective view illustrating the secondary battery of FIG. 1. FIG. 3 is a schematic perspective view illustrating the electrode assembly of FIG. 2. FIG. 4 is a schematic perspective view illustrating the terminal plate and the terminal connection member of FIG. 2. FIG. 5 is a bottom schematic perspective view illustrating the terminal connection member of FIG. 4.

Referring to FIGS. 1 to 5, the secondary battery module includes a plurality of secondary batteries 100 and a plurality of bus bars 200 for electrically coupling the secondary batteries 100.

Each of the secondary batteries 100 may include an electrode assembly 110, a first collecting plate 120, a second collecting plate 130, a battery case 140, and a cap assembly 150.

The electrode assembly 110 may include a first electrode plate 111, a second electrode plate 112, a first separator 113, and a second separator 114. In one embodiment, one of the first electrode plate 111 and the second electrode plate 112 may be a positive electrode plate and the other one may be a negative electrode plate. According to one embodiment, the first electrode plate 111 is the positive electrode plate and the second electrode plate 112 is the negative electrode plate.

The first electrode plate 111 may include a first active material portion 111a, which is a region where a first active material is coated on a first electrode collector, and a first non-coating portion 111b, which is a region of the first electrode collector where the first active material is not coated (e.g. the rest of the first electrode collector, excluding the first active material portion 111a).

The first electrode collector may be a conductive material plate, and may be formed from a material selected from aluminum (Al), nickel (Ni), titanium (Ti), and baked carbon (C). However, embodiments of the present invention are not limited thereto. In one embodiment, any suitable material with high conductivity may be used as the first electrode collector, so long as it does not cause a chemical change in the battery.

The first active material may include a positive electrode active material such as, for example, a layer-shaped compound that includes lithium (Li), a conductive material that improves conductivity, and a binder for increasing bond strength between the positive electrode active material and the conductive material. In one embodiment, the first active material portion 111a may be formed by mixing the positive electrode active material, the conductive material, and the binder with a solvent to make a slurry, and coating the slurry on a surface of the first electrode collector.

The second electrode plate 112 may include a second active material portion 112a, which is a region where a second active material is coated on a second electrode collector, and a second non-coating portion 112b, which is a region of the second electrode collector where the second active material is not coated (e.g. the rest of the second electrode collector, excluding the second active material portion 112a).

The second electrode collector may be a conductive metal plate, and may be formed from a material selected from copper (Cu), stainless steel, Al, and Ni. However, embodiments of the present invention are not limited thereto. In one embodiment, any suitable metal plate with high conductivity may be used as the second electrode collector, so long as it does not cause a chemical change in the battery.

The second active material may include a negative electrode active material and a binder for increasing bond strength of the negative electrode active material. In one embodiment, the second active material portion 112a may be formed by mixing the negative electrode active material and the binder with a solvent to make slurry, and coating the slurry on a surface of the second electrode collector.

One of the first and second separators 113 and 114 may be arranged between the first electrode plate 111 and the second electrode plate 112, and the other one of the first and second separators 113 and 114 may be arranged outside one of the first electrode plate 111 and the second electrode plate 112. For example, the first separator 113 may be arranged between the first electrode plate 111 and the second electrode plate 112, and the second separator 114 may be arranged outside the second electrode plate 112.

The first and second separators 113 and 114 may be insulating thin films with high ion transmittance and mechanical strength. In one embodiment, the first and second separators 113 and 114 may each be a thin film formed from a material selected from polyethylene (PE), polypropylene (PP), and polyvinylidene fluoride (PVdF), and may each include a plurality of minute through holes. Accordingly, the first and second separators 113 and 114 may prevent or reduce the risk of the first electrode plate 111 and the second electrode plate 112 contacting each other, while also providing a path for lithium ions.

In one embodiment, the electrode assembly 110 may be manufactured by winding the first electrode plate 111, the first separator 113, the second electrode plate 112, and the second separator 114, all having a substantially uniform width, around a winding axis.

The electrode assembly 110 may be accommodated in the battery case 140 along with an electrolyte. The electrolyte may include an organic solvent, lithium salt (for example, $LiPF_6$, $LiBF_4$, or the like), and an additive. In one embodiment, the electrolyte may be a solution obtained by dissolving the lithium salt and the additive in the organic solvent. The organic solvent may dissolve a sufficient (or desired) amount of the lithium salt and may have low viscosity. In one embodiment, the organic solvent may be inactive (or non-reactive) on the surfaces of the first electrode plate 111 and the second electrode plate 112 during the process of charging and discharging the secondary battery. The organic solvent may include, without limitation, at least one selected from ethylene carbonate (EC), propylene carbonate (PC), dimethyl carbonate (DMC), diethyl carbonate (DEC), and ethyl methyl carbonate (EMC).

In one embodiment, the electrolyte is a solid electrolyte and may be used with polymer gel. When an electrolyte is used together with the polymer gel, the resulting electrolyte may have a high boiling point and high combustion stability. Accordingly, the possibility of the electrolyte leaking to the outside of the battery case 140 may be prevented or reduced. The polymer gel may include at least one selected from polyethylene glycol (PEG), polyacrylonitrile (PAN), polymethylmethacrylate (PMMA), and polyvinyldifluoride (PVDF).

In one embodiment, the polymer gel may be formed by a gelation reaction of a precursor of a polymer (sometimes referred to as a "prepolymer"). For example, the polymer gel may be formed by placing the precursor in the battery case 140 and then heating the battery case 140.

In one embodiment, the first collecting plate 120 may be coupled to the first electrode plate 111 and the second collecting plate 130 may be coupled to the second electrode plate 112. For example, the first collecting plate 120 may be welded to the first non-coating portion 111a and the second collecting plate 130 may be welded to the second non-coating portion 112b. The first collecting plate 120 and the second collecting plate 130 may each be formed from a material selected from Al, an alloy of Al and Cu, and a Cu alloy. In one embodiment, the first collecting plate 120 and the second collecting plate 130 may be accommodated in the battery case 140 along with the electrode assembly 110.

The battery case 140 may be hexahedral and may have an opening on one side of the battery case 140. The electrode assembly 110 may be inserted into and accommodated in the battery case 140 through the opening.

The battery case 140 may be formed of a conductive metal such as, for example, Al, an Al alloy, or steel plated with Ni. In one embodiment, an internal surface of the battery case 140 may be insulation-processed, so that the battery case 140 may be insulated from the electrode assembly 110 inside the battery case 140 and the cap assembly 150.

The cap assembly 150 may be combined (or coupled) with the opening of the battery case 140 and may seal up the inside of the battery case 140. The cap assembly 150 may include a cap plate 151, a first gasket 152, a first terminal 153, a second gasket 154, and a second terminal 155.

The cap plate 151 may seal up the opening of the battery case 140 and may be formed of the same material as the battery case 140. The cap plate 151 may include a safety vent 151a. In one embodiment, the cap plate 151 may be combined with (or coupled to) the battery case 140 through laser welding.

The first and second gaskets 152 and 154 may be separately arranged on the cap plate 151 (e.g., the first and second gaskets 152 and 154 may be spaced from each other on the cap plate 151). Accordingly, the first and second terminals 153 and 155 may be separately arranged on the cap plate 151, and the positions of the first and second terminals 153 and 155 on the cap plate 151 may respectively correspond to the positions of the first and second gaskets 152 and 154 on the cap plate 151.

In one embodiment, the first and second gaskets 152 and 154 insulate the first and second terminals 153 and 155 from the cap plate 151, respectively. Accordingly, the first and second gaskets 152 and 154 may be formed of an insulating material. In addition, the first and second gaskets 152 and 154 may seal up a gap between each of the first and second terminals 153 and 155 and the cap plate 151, and may prevent or reduce external moisture from permeating the secondary battery 100 and/or prevent or reduce the electrolyte accommodated in the secondary battery 100 from leaking to the outside.

The first terminal 153 may include a first terminal plate 153a and a first terminal connection member 153b.

The first terminal plate 153a may be positioned on the first gasket 152. The first terminal plate 153a may be electrically coupled to the first collecting plate 120. The first terminal plate 153a may be formed from a material selected from stainless steel, Cu, a Cu alloy, Al, and an Al alloy. For example, the first terminal plate 153a may be formed of Al.

The first terminal plate 153a may include a protrusion 153a-1 that protrudes upward and away from the first gasket 152. The protrusion 153a-1 may include a screw thread around an external circumference of the protrusion 153a-1. In other words, the protrusion 153a-1 may be a male screw. The first terminal plate 153a may further include a locking groove 153a-2 positioned in one part of a top surface of the first terminal plate 153a opposite the first gasket 152.

The first terminal connection member 153b may be positioned on the first terminal plate 153a and may be electrically coupled to the bus bar 200. The first terminal connection member 153b may include a groove 153b-1 that may be coupled with the protrusion 153a-1 of the first terminal plate 153a, such that the protrusion 153a-1 may be inserted into the groove 153b-1 from the bottom surface of the first terminal connection member 153b. The groove 153b-1 may include a screw thread on an internal circumference of the groove 153*b*-1 and corresponding to the screw thread of the protrusion 153*a*-1.

The first terminal connection member 153*b* may further include a locking protrusion 153*b*-2 that may be coupled to the locking groove 153*a*-2 of the first terminal plate 153*a*. When the locking protrusion 153*b*-2 is inserted into and is coupled to the locking groove 153*a*-2, the first terminal connection member 153*b* and the first terminal plate 153*a* may be fixed to each other, and their rotation with respect to each other may be prevented or reduced.

The first terminal connection member 153*b* may be formed from a material selected from stainless steel, Cu, a Cu alloy, Al, and an Al alloy. For example, the first terminal connection member 153*b* may be formed of Cu.

The second terminal 155 may include a second terminal plate 155*a* and a second terminal connection member 155*b*.

The second terminal plate 155*a* may be positioned on the second gasket 154. The second terminal plate 155*a* may be electrically coupled to the second collecting plate 130. A material for forming the second terminal plate 155*a* may be the same as the material for forming the first terminal plate 153*a*. For example, the second terminal plate 155*a* may be formed of Al.

The second terminal plate 155*a* may include a protrusion 155*a*-1 that protrudes upward and away from the second gasket 154. The protrusion 155*a*-1 may include a screw thread around an external circumference of the protrusion 155*a*-1. In other words, the protrusion 155*a*-1 may be a male screw. The second terminal plate 155*a* may further include a locking groove 155*a*-2 positioned in one part of a top surface of the second terminal plate 155*a* opposite the second gasket 154.

The second terminal connection member 155*b* may be positioned on the second terminal plate 155*a* and may be electrically coupled to the bus bar 200. The second terminal connection member 155*b* may include a groove 155*b*-1 that may be coupled to the protrusion 155*a*-1 of the second terminal plate 155*a*, such that the protrusion 155*a*-1 may be inserted into the groove 155*b*-1 from the bottom of the second terminal connection member 155*b*. The groove 155*b*-1 may include a screw thread on an internal circumference of the groove 155*b*-1 and corresponding to the screw thread of the protrusion 155*a*-1.

The second terminal connection member 155*b* may further include a locking protrusion 155*b*-2 that may be coupled to the locking groove 155*a*-2 of the second terminal plate 155*a*. When the locking protrusion 155*b*-2 is inserted into and is coupled to the locking groove 155*a*-2, the second terminal connection member 155*b* and the second terminal plate 155*a* may be fixed to each other, and their rotation with respect to each other may be prevented or reduced.

The second terminal connection member 155*b* may be formed of the same material as the first terminal connection member 153*b*. For example, the second terminal connection member 155*b* may be formed of Cu.

The bus bars 200 may be, for example, in a shape of a plate and may be formed of the same material as the first and second terminal connection members 153*b* and 155*b*. The bus bars 200 may be coupled onto the first and second terminal connection members 153*b* and 155*b* through welding. In one embodiment, the welding may be laser welding. As further illustrated in FIG. 1, when two secondary batteries 100 are positioned next to each other, the bus bars 200 may be electrically connected to the first terminal connection member and the second terminal connection member of adjacent secondary batteries 100, respectively. Accordingly, one secondary battery 100 may be electrically coupled to an adjacent secondary battery 100 through the bus bars 200. In one embodiment, the bus bars 200 are formed of the same material as the first and second terminal connection members 153*b* and 155*b*, and thus, it may be possible to improve bond strength and prevent or reduce the deterioration in bond strength that occurs when dissimilar metals are welded.

Figure 6:
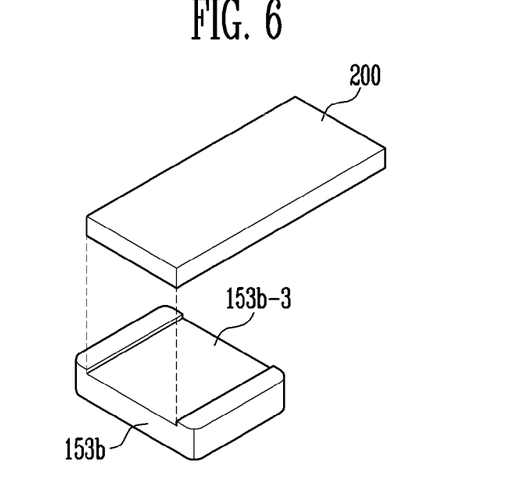
FIGS. 6 and 7 are schematic perspective views illustrating a terminal connection member and a bus bar that may be included in a secondary battery module according to an embodiment of the present invention.
Figure 7:
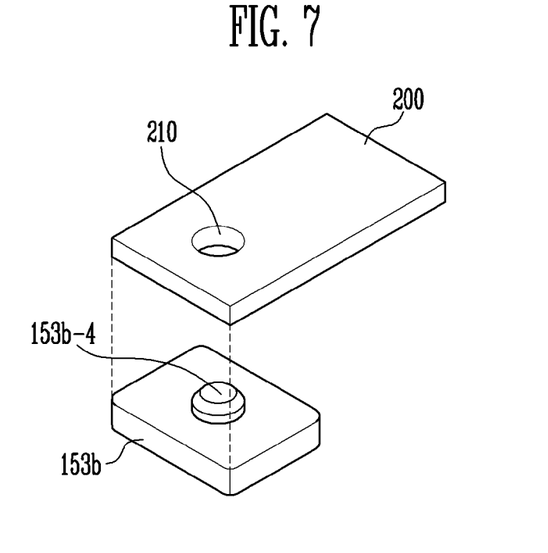

Hereinafter, embodiments of the present invention are described with reference to FIGS. 6 and 7. In FIGS. 6 and 7, elements that are the same as those described in connection with FIGS. 1 to 5 are denoted by the same reference numerals, and detailed description thereof will not be provided again. Accordingly, in order to avoid redundant description, differences between FIGS. 1 to 5 and FIGS. 6 and 7 will be primarily described.

FIGS. 6 and 7 are each a perspective schematic view illustrating a terminal connection member and a bus bar for a secondary battery module according to one or more embodiments of the present invention.

Referring to FIG. 6, one surface of the first terminal connection member 153*b* (e.g. top surface) may include a concave portion 153*b*-3 (e.g. a groove) inside which the bus bar 200 may be accommodated. In one embodiment, the concave portion 153*b*-3 may extend (or be elongated) in one direction of the terminal connection member 153*b*, for example, in a width direction of the terminal connection member 153*b*. When the bus bar 200 is accommodated in the concave portion 153*b*-3, the bus bar 200 and the terminal connection member 153*b* may be coupled by welding. In one embodiment, the bus bar 200 and the terminal connection member 153*b* may be coupled by fillet welding.

Referring now to FIG. 7, one surface of the first terminal connection member 153*b* (e.g. top surface) may alternatively include a protruding portion 153*b*-4 that can be combined with the bus bar 200. In this case, the bus bar 200 may include an opening 210 corresponding to the protruding portion 153*b*-4 of the terminal connection member 153*b*. In one embodiment, the bus bar 200 may be arranged on the first terminal connection member 153*b* such that the opening 210 of the bus bar 200 corresponds to the protruding portion 153*b*-4 of the terminal connection member 153*b*, and the bus bar 200 and the first terminal connection member 153*b* may be then coupled by welding. In one embodiment, the bus bar 200 and the first terminal connection member 153*b* may be coupled by butt welding. Specifically, the opening 210 of the bus bar 200 and the protruding portion 153*b*-4 of the first terminal connection member 153*b* may be butt welded so that the bus 200 and the first terminal connection member 153*b* may be fixed to each other.

While certain exemplary embodiments have been disclosed herein, it is to be understood that the present disclosure is not limited to the disclosed embodiments, but, on the contrary, is intended to cover various modifications and equivalent arrangements included within the spirit and scope of the appended claims and equivalents thereof. Although specific terms have been employed, they are to be interpreted in a generic and descriptive sense only and not for purposes of limitation.

What is claimed is:
1. A secondary battery comprising:
   an electrode assembly comprising a first electrode plate, a second electrode plate, and a separator;
   a battery case accommodating the electrode assembly; and a cap assembly comprising a cap plate coupled to the battery case and sealing the battery case, and first and second terminals spaced from each other on the cap plate, wherein the first and second terminals respectively comprise:

first and second terminal plates, each of the first and second terminal plates comprising a base on the cap plate and a protrusion protruding from the base and away from the electrode assembly; and first and second terminal connection members respectively on the base of the first and second terminal plates, each of the first and second terminal connection members comprising a groove coupled with the corresponding protrusion.

2. The secondary battery as claimed in claim 1, wherein an external surface of the protrusion and an internal surface of the groove each comprise a screw thread, and wherein the screw thread of the groove corresponds to the screw thread of the protrusion.

3. The secondary battery as claimed in claim 2, wherein surfaces of the first and second terminal plates respectively facing the first and second terminal connection members each comprise a locking groove, wherein surfaces the first and second terminal connection members respectively facing the first and second terminal plates each comprise a locking protrusion, and wherein the locking protrusions of the first and second terminal connection members are in the locking grooves of the first and second terminal plates, respectively.

4. The secondary battery as claimed in claim 3, wherein surfaces of the first and second terminal connection members respectively opposite the first and second terminal plates each comprise a concave portion extending in one direction.

5. The secondary battery as claimed in claim 3, wherein surfaces of the first and second terminal connection members respectively opposite the first and second terminal plates each comprise a protruding portion protruding away from the cap plate.

6. The secondary battery as claimed in claim 1, wherein the secondary battery further comprises first and second collecting plates accommodated in the battery case and electrically coupled to the first and second electrode plates and the first and second terminal plates, respectively.

7. The secondary battery as claimed in claim 1, wherein the secondary battery further comprises first and second gaskets between the cap plate and the first and second terminal plates, respectively.

8. A secondary battery module comprising:

a plurality of secondary batteries, each of the plurality of secondary batteries comprising an electrode assembly, a battery case accommodating the electrode assembly, and a cap assembly; and a plurality of bus bars electrically coupled to the plurality of secondary batteries, wherein the cap assembly comprises a cap plate coupled to the battery case and sealing the battery case, and first and second terminals spaced from each other on the cap plate, wherein the first and second terminals each comprise:

first and second terminal plates, each of the first and second terminal plates comprising a base on the cap plate and a protrusion protruding from the base and away from the electrode assembly; and first and second terminal connection members respectively on the base of the first and second terminal plates, each of the first and second terminal connection members comprising a groove coupled with the corresponding protrusion, wherein the first and second terminal connection members electrically couple the first and second terminal plates and the bus bars, respectively.

9. The secondary battery module as claimed in claim 8, wherein the first and second terminal connection members and the bus bars are formed of the same material.

10. The secondary battery module as claimed in claim 9, wherein an external surface of the protrusion and an internal surface of the groove each comprise a screw thread, and wherein the screw thread of the groove corresponds to the screw thread of the protrusion.

11. The secondary battery module as claimed in claim 10, wherein surfaces of the first and second terminal plates respectively facing the first and second terminal connection members each comprise a locking groove, wherein surfaces of the first and second terminal connection members respectively facing the first and second terminal plates each comprise a locking protrusion, and wherein the locking protrusions of the first and second terminal connection members are in the locking grooves of the first and second terminal plates, respectively.

12. The secondary battery module as claimed in claim 11, wherein surfaces the first and second terminal connection members respectively opposite the first and second terminal plates each comprise a concave portion extending in one direction.

13. The secondary battery module as claimed in claim 11, wherein surfaces of the first and second terminal connection members respectively opposite the first and second terminal plates each comprise a protruding portion protruding away from the cap plate, and wherein each of the plurality of bus bars comprises an opening corresponding to the protruding portion.

14. The secondary battery module as claimed in claim 8, wherein the secondary battery module further comprises first and second collecting plates accommodated in the battery case and electrically coupled to the first and second electrode plates and the first and second terminal plates, respectively.

15. The secondary battery module as claimed in claim 8, wherein the secondary battery module further comprises first and second gaskets between the cap plate and the first and second terminal plates, respectively.

\* \* \* \* \*